(12) United States Patent
Edler et al.

(10) Patent No.: US 8,708,615 B2
(45) Date of Patent: Apr. 29, 2014

(54) CEMENTED CARBIDE INSERT AS WELL AS A CEMENTED CARBIDE BLANK FOR THE MANUFACTURE OF SUCH CUTTING INSERTS

(75) Inventors: Daniel Edler, Sandviken (SE); Elisabeth Nordin, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 225 days.

(21) Appl. No.: 13/116,516

(22) Filed: May 26, 2011

(65) Prior Publication Data

US 2011/0299948 A1 Dec. 8, 2011

(30) Foreign Application Priority Data

Jun. 2, 2010 (SE) ...................................... 1050557

(51) Int. Cl.
*B23B 27/14* (2006.01)

(52) U.S. Cl.
USPC .......................................... 407/113; 407/118

(58) Field of Classification Search
USPC .......................................... 407/118, 119, 113
See application file for complete search history.

(56) References Cited

U.S. PATENT DOCUMENTS

| 4,159,885 | A | * | 7/1979 | Schott | 407/114 |
|---|---|---|---|---|---|
| 5,193,948 | A | * | 3/1993 | Noggle | 407/116 |
| 5,246,315 | A | * | 9/1993 | Hansson et al. | 407/114 |
| 5,569,000 | A | * | 10/1996 | Littecke et al. | 407/114 |
| 5,921,721 | A | * | 7/1999 | Hintze et al. | 407/113 |
| 6,155,755 | A | * | 12/2000 | Kanada et al. | 407/118 |
| 6,612,786 | B1 | * | 9/2003 | Kanada et al. | 407/118 |
| 6,742,970 | B2 | * | 6/2004 | Oles et al. | 407/113 |
| 7,387,474 | B2 | * | 6/2008 | Edler et al. | 407/113 |
| 7,520,701 | B2 | * | 4/2009 | Kukino | 407/119 |
| 7,687,156 | B2 | * | 3/2010 | Fang et al. | 428/698 |
| 7,765,902 | B2 | * | 8/2010 | Kuroda et al. | 82/1.11 |
| 7,946,792 | B2 | * | 5/2011 | Oles et al. | 407/119 |
| 2004/0258944 | A1 | | 12/2004 | Oles et al. | |

FOREIGN PATENT DOCUMENTS

| DE | 102008042493 A1 | * | 4/2009 |
|---|---|---|---|
| EP | GB 1093055 | * | 11/1967 |
| EP | 0 940 215 | | 9/1999 |
| EP | 1 702 703 | | 9/2006 |
| GB | 902193 | * | 7/1962 |
| JP | 63221906 A | * | 9/1988 |
| JP | 08192305 A | * | 7/1996 |
| JP | 10180507 A | * | 7/1998 |
| JP | 2004042157 A | * | 2/2004 |
| JP | 2008260090 A | * | 10/2008 |

* cited by examiner

*Primary Examiner* — Daniel Howell
*Assistant Examiner* — Nicole N Ramos
(74) *Attorney, Agent, or Firm* — Morgan, Lewis & Bockius LLP

(57) ABSTRACT

A cemented carbide insert, including an upper side, an under side, a plurality of side surfaces extending between the upper side and the underside, and an inset including a cutting edge. The cutting edge includes a nose edge and two main edges converging toward the nose edge. The inset is formed of a material that is harder than the cemented carbide, and is countersunk in the surrounding cemented carbide and co-ground with the surrounding cemented carbide. The inset is arranged in a front, wedge-shaped head delimited by one chip surface and two clearance surfaces running along the main edges. The inset transforms into an adjacent body part via limiting surfaces situated inside imaginary planes in the extension of the chip surface and the clearance surfaces.

17 Claims, 8 Drawing Sheets

CEMENTED CARBIDE INSERT AS WELL AS A CEMENTED CARBIDE BLANK FOR THE MANUFACTURE OF SUCH CUTTING INSERTS

This application claims priority under 35 U.S.C. §119 to Swedish Patent Application No. 1050557-6, filed on Jun. 2, 2010, which is incorporated by reference herein in its entirety.

FIELD OF THE INVENTION

The present invention relates generally to a cemented carbide insert of the type that includes an upper side, an under side, and a number of side surfaces extending between the same as well as at least one cutting edge, which includes a nose edge and two main edges converging toward the same and is included in an inset, which includes a material that is harder than the cemented carbide, and which is countersunk in the surrounding cemented carbide and co-ground with the same. In a second aspect, the invention also relates to a cemented carbide blank for the manufacture of cutting inserts of the kind in question.

BACKGROUND OF THE INVENTION

By U.S. Pat. No. 7,387,474, an indexable turning insert is previously known, which has a rhombic basic shape and includes two diametrically opposed cutting edges, which individually comprise two main edges, which converge toward a common secondary or nose edge, which forms a rounded transition between the two main edges, and which always generates the exposed surface in the workpiece irrespective of which one of the two main edges that is active and provides for the active chip removal. In order to enable good machining results in respect of dimensional accuracy and surface smoothness irrespective of the index position of the cutting insert, it is important that the nose edges of the cutting insert are situated at exactly equally large distances not only from the center of the cutting insert (which in this case is represented by a through hole for a fixing screw), but also from the under side of the cutting insert. Only in such a way it is ensured that the active nose edge always assumes one and the same spatial position in relation to the basic body of the tool in which the cutting insert is mounted. For this reason, it is necessary to precision grind not only the upper side of the cutting insert but also the clearance surfaces that delimit the cutting edges together with the upper side. In this connection, the requirements of dimensional accuracy are often within the range of ±0.025 mm.

The same stiff requirements of dimensional accuracy are also made on cutting inserts having only one cutting edge. Thus, it is required that the single cutting edge is located in an accurately defined spatial position in relation to the support points of the cutting insert (e.g. rear side support surfaces or a groove in a lower connecting surface) for the nose edge to assume an exact predetermined position in relation to the basic body of the tool in which the cutting insert is mounted.

All forms of grinding of cemented carbide inserts are costly. The rule is that the cost increases with increasing grinding surface and increasing grinding depth. Another factor than the cost factor of great importance to the user is the quality of the grinding. A user responsible for machining an expensive workpiece needs of course to have reliance in not only the basic body of the tool but above all the replaceable cutting inserts, which gradually are consumed. Therefore, if a cutting insert would be impaired by even the slightest defective grinding, e.g. in transitions between different surfaces on the cutting insert, the ability of the cutting insert to machine the workpiece in a dimensionally accurate way would diminish. In this connection, it should be pointed out that also utmost small grinding defects will be visible to the naked eye by the reflection of the light from the ground surfaces. If the user would suspect that a cutting insert is defect, there is a risk that he directly discards the same.

Already grinding of genuine cemented carbide inserts, i.e., cutting inserts exclusively made from cemented carbide, is accordingly a delicate task, in particular if the pressing/sintering and the grinding, respectively, of the cutting inserts are carried out by different actors in different works. The task becomes even more delicate if the cemented carbide inserts in addition are to be provided with particularly hard insets precisely in the area of the cutting edges. When turning materials particularly difficult to machine, such as hardened steel, cast iron and the like, it is accordingly desirable to supplement the cemented carbide with a particular inset of a material, e.g. cubic boron nitride (CBN), and to form the individual cutting edge in the inset, more precisely by grinding a chip surface as well as a connecting clearance surface. Although such insets usually are only of millimeter size, they make the grinding significantly more difficult, not only in respect of time-consumption and cost, but also in respect of the quality of the finish-ground surfaces, in particular in transitions between the individual inset and the surrounding cemented carbide.

An example of a cutting insert that makes use of a superhard inset, in which the cutting edge is shaped, is disclosed in U.S. Patent Application Publication No. 2004/0258944 A1. A disadvantage of this cutting insert is, however, that the manufacture requires grinding of large cemented carbide surfaces in addition to the relatively small surfaces on the inset that are required to delimit the cutting edge. Thus, not only the chip surface of the hard inset but also the adjacent cemented carbide surface included in the upper side of the cutting insert has to be ground. In an analogous way, the cemented carbide surfaces surrounding the clearance surfaces of the inset have to be ground all the way from the inset to the center of the cutting insert. This means that unnecessary energy and time are consumed to grind in the inset while ensuring neat transitions between the inset and the surrounding cemented carbide.

The present invention aims at obviating the above-mentioned problems and at providing an improved cemented carbide insert of the type that requires simultaneous precision grinding of surfaces on an extremely hard inset as well as surrounding surfaces of cemented carbide. Therefore, an object of the invention is to provide a cemented carbide insert, in particular a turning insert, e.g. of the type that is disclosed in U.S. Pat. No. 7,387,474, which can be made with an inset difficult to grind of an extraordinary hard nature, and which in spite of said inset can be precision ground in a simple and cost-effective way.

SUMMARY OF THE INVENTION

In an embodiment, the invention provides a cemented carbide insert, including an upper side, an under side, a plurality of side surfaces extending between the upper side and the underside, and an inset including a cutting edge. The cutting edge includes a nose edge and two main edges converging toward the nose edge. The inset is formed of a material that is harder than the cemented carbide, and is countersunk in the surrounding cemented carbide and co-ground with the surrounding cemented carbide. The inset is arranged in a front, wedge-shaped head delimited by one chip surface and two clearance surfaces running along the main edges. The inset transforms into an adjacent body part via limiting surfaces situated inside imaginary planes in the extension of the chip surface and the clearance surfaces.

In another embodiment, the invention provides a cemented carbide blank for the manufacture of the cemented carbide insert.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 7:
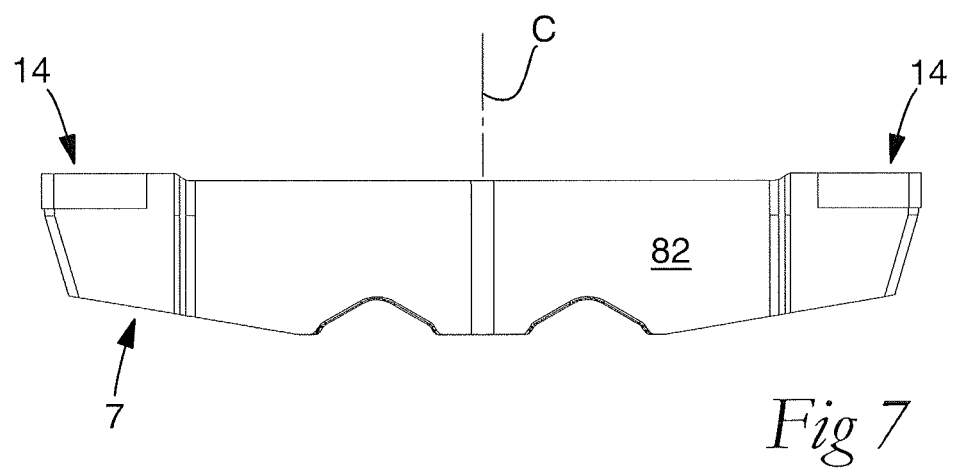
FIG. 7 is a side view of the blank in the same state as in FIG. 6.
Figure 8:
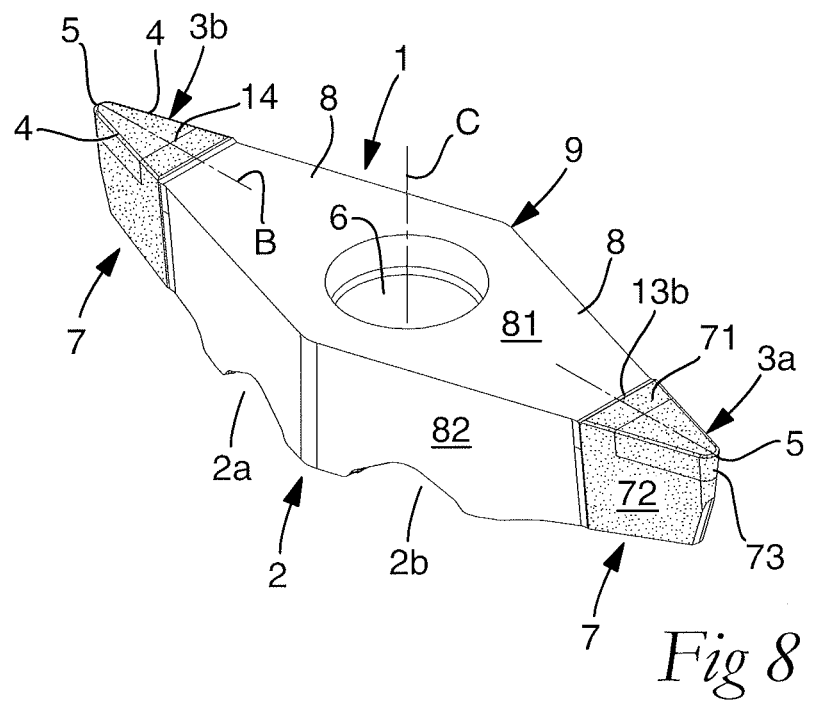
FIG. 8 is a top perspective view of the completed, ground cutting insert.
Figure 9:
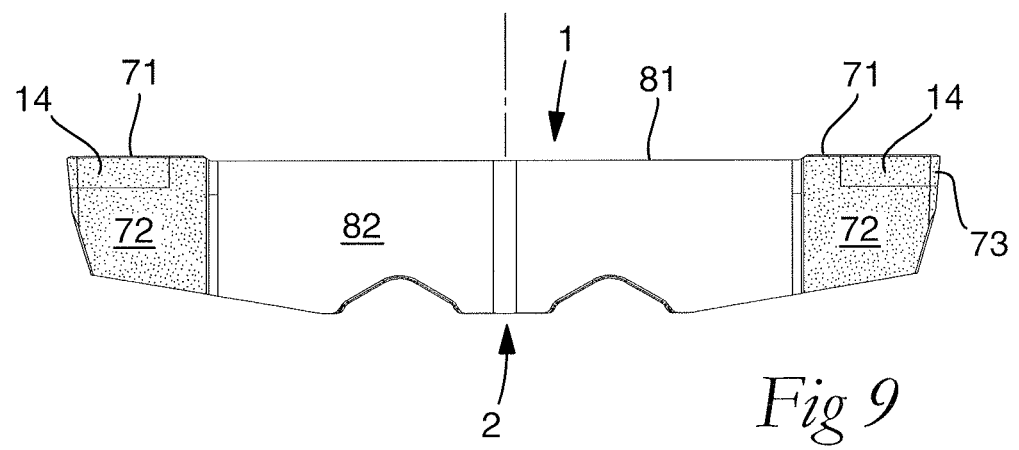
FIG. 9 is a side view of the cutting insert according to FIG. 8.
Figure 10:
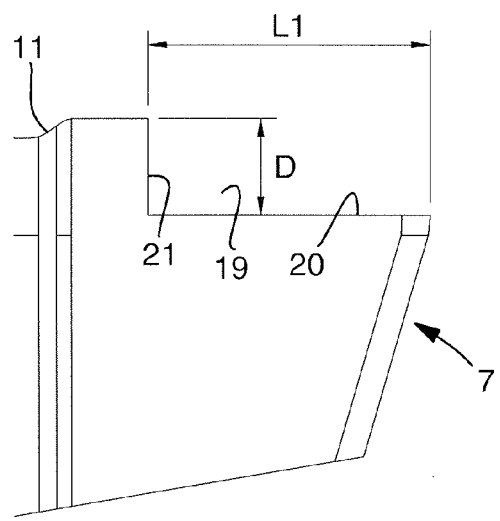
FIG. 10 is a dimensioned, enlarged side view of the individual pocket in the blank according to FIG. 4.
Figure 11:
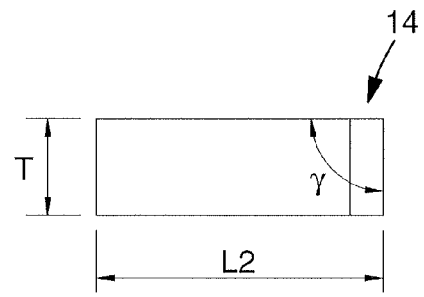
FIG. 11 is a dimensioned side view of the individual inset in the unground state.
Figure 12:
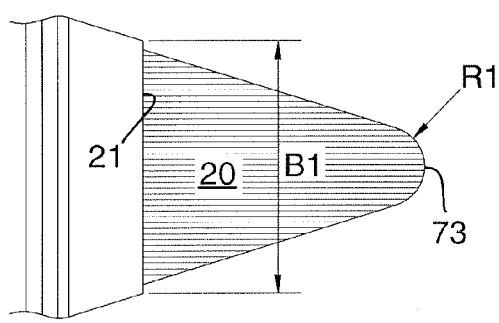
FIG. 12 is a planar view corresponding to FIG. 10 of the pocket as viewed from above.
Figure 13:
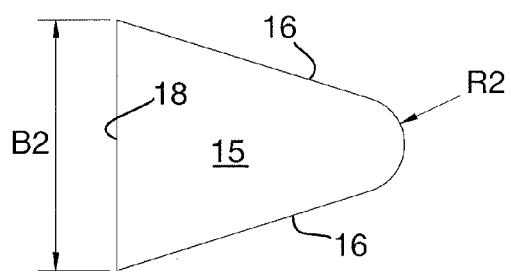
FIG. 13 is a planar view from above of the unground inset according to FIG. 11.

A ready for use, ground cutting insert according to an embodiment of the invention is shown in FIGS. 8 and 9. In these figures, it is seen that the cutting insert includes an upper side generally designated 1, an under side 2, and a number of side surfaces extending between the same, which will be described in more detail below. The cutting insert has a rhombic basic shape and includes two diametrically opposed cutting edges 3a, 3b, each one of which includes two main edges 4 and a secondary or nose edge 5, against which the main edges 4 converge. The main edges 4 are straight, while the nose edge 5 is rounded and has a suitable radius. The angle of convergence or the so-called nose angle may vary, but amounts to 35° in the example according to FIGS. 1-9. Between the upper and under sides 1, 2, a through hole 6 extends, the center axis C of which represents the center of the cutting insert. It should also be pointed out that the individual nose edge 5 is intersected by a bisector B between the two converging main edges 4.

In the exemplified embodiment, the under side of the cutting insert 2 has the shape of a connecting surface, which includes two female-like recesses or grooves 2a, 2b intended to alternately co-operate with a ridge-shaped male member of a complementary connecting surface in the basic body of the tool (not shown) in which the cutting insert is mounted. The distance between the cutting edge 3a and the groove 2a should be as great as the distance between the cutting edge 3b and the groove 2b to ensure that the individual nose edge 5 always assumes one and the same spatial position in relation to the basic body of the tool irrespective of which cutting edge that has been indexed up to an active position.

Figure 16:
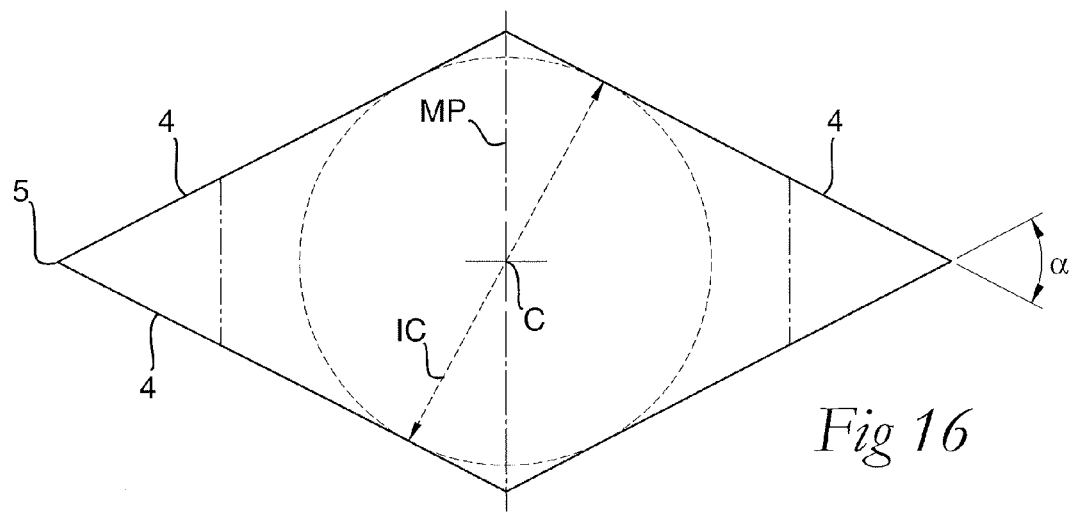
FIG. 16 is a schematic geometry picture showing the starting dimensions of a conventional, double-edged turning insert according to U.S. Pat. No. 7,387,474 without insets.

Reference is now made to FIG. 16, which illustrates the geometrical shape of a rhomb having a nose angle α, which in the example is shown to amount to 55°. This rhomb illustrates the simple basic shape of a previously known cutting insert of the kind in question (e.g. according to U.S. Pat. No. 7,387, 474). The four branches of the rhomb, which represent the above-mentioned main edges 4, run in pairs together into tips, which represent the nose edges 5 of the cutting insert. A circle inscribed in the rhomb has a diameter IC, which by those skilled in the art is denominated "the IC measure", and which is used to define the size of the cutting insert, e.g. within a set having different insert sizes. If a superhard inset, e.g. a CBN inset, outlined by means of a dash-dotted line, would be integrated into the cutting insert, an exceptionally meticulous grinding is required of not only the chip and clearance surfaces of the inset, but also the surrounding cemented carbide surfaces all the way up to the center plane MP that divides the cutting insert into two identical halves. In this connection, the total grinding area of the cemented carbide is considerably larger than the grinding area of the superhard material of the inset. If the grinding would become too deep or too shallow, the deviation gets a great effect on the radial distance between the tip 5 and the center C of the rhomb or cutting insert.

Figure 17:
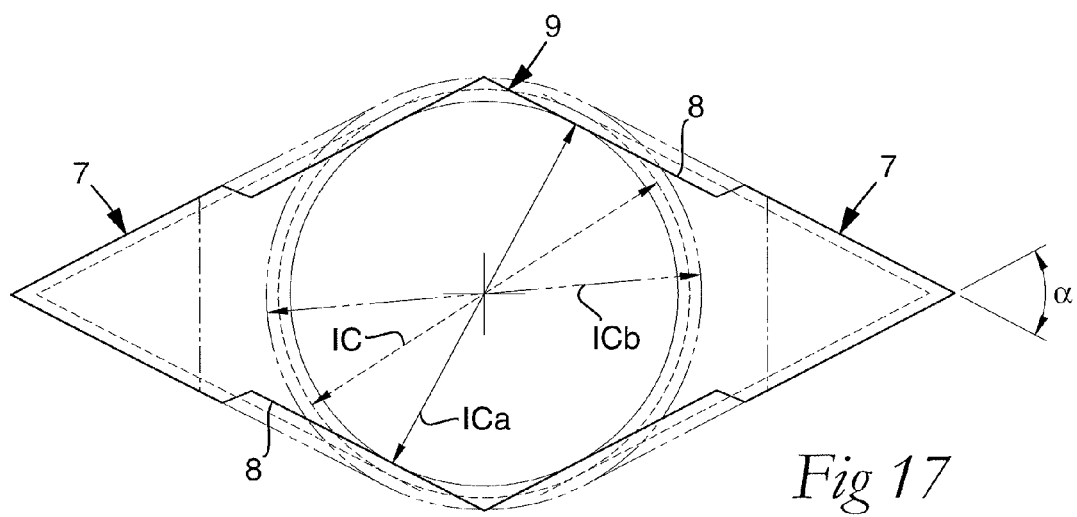
FIG. 17 is an analogous picture showing the initial geometrical shaping of the cutting insert according to an embodiment of the invention.
Figure 18:
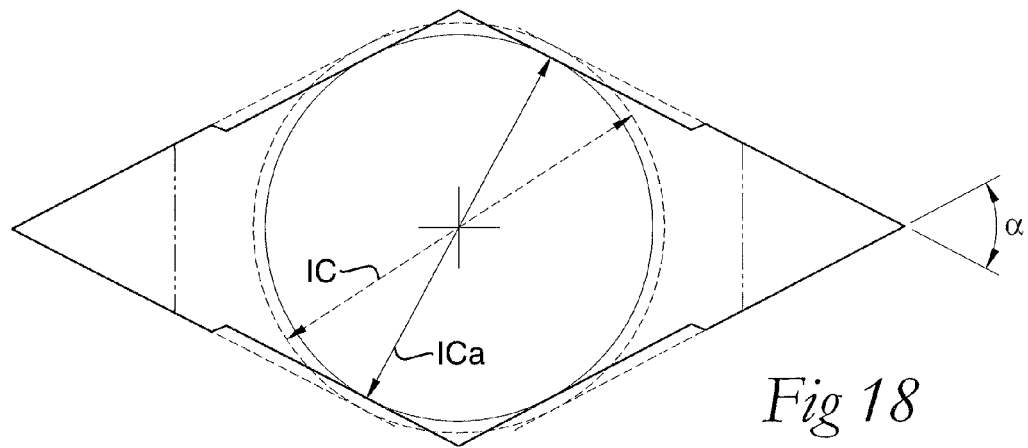
FIG. 18 is a geometry picture showing the shape of the cutting insert after grinding.

The geometrical structural difference between the conventional cutting insert according to FIG. 16 and the cutting insert according to the embodiment is evident from a comparison between FIG. 16 and FIGS. 17-18. Thus, in FIG. 17, it is seen how a blank for the manufacture of the cutting insert has been "narrowed in the middle and widened at the tips". More precisely, at the two opposite, acute ends thereof, a blank, which is to form the cutting insert, has been given the shape of wedge-shaped heads 7, which at the rear ends thereof transform into each a tapering part 8 of an intermediate body, which in its entirety is designated 9. Suppose that the IC measure of the conventional cutting insert shown in FIG. 16 amounts to 10.0 mm. In the example shown in FIG. 17, the IC measure ICa of the body 9 has been reduced to 9.8 mm at the same time as the measure ICb of the individual head 7 of the blank has been increased to 10.2 mm. When the blank after fixation of the individual inset is ground to its final shape, 0.1 mm (=grinding allowance) may be ground off on each side of the individual head 7, as is shown in FIG. 18. The grinding allowance (0.1 mm) is indicated by the dashed line S in FIG.

17. In such a way, the original measure ICb of the blank is reduced to 10.0 mm, i.e., the same IC measure as of the conventional cutting insert according to FIG. 16.

Reference is now made to FIGS. 1-9, which illustrate different steps in connection with the manufacture of the cutting insert. In the different drawing figures, the surfaces that are ground during the different steps are distinguished from the surfaces that are directly pressed, i.e., unground, more precisely by the ground surfaces having been screened. In this connection, it should be borne in mind that cemented carbide is created by pressing and sintering a powder mass consisting of hard carbides (WC, TiC, TaC, NbC) and a binder metal (Co). Ultra hard and more expensive insets are manufactured in another way. For instance, CBN insets are produced by binding cubic boron crystals with a ceramic or metallic binder phase at high temperature and high pressure.

Figure 1:
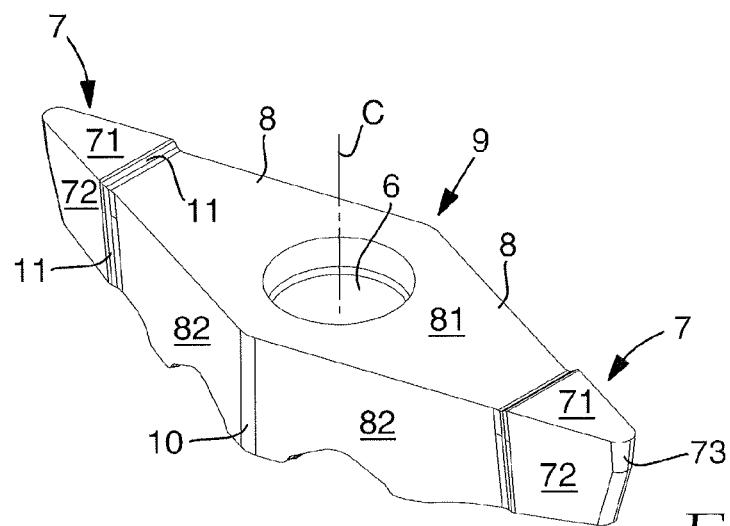
FIG. 1 is a bird's eye view of an unground blank for the manufacture of a cutting insert according to an embodiment of the invention.
Figure 2:
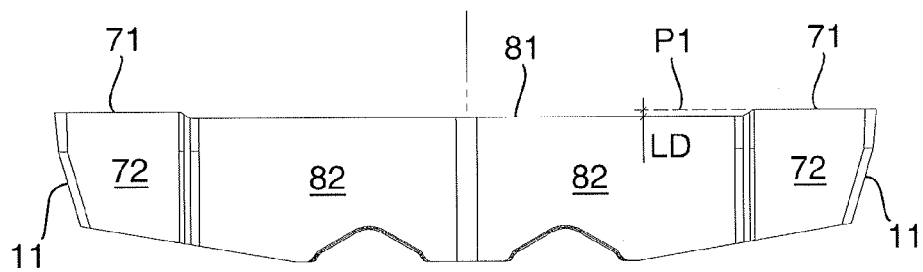
FIG. 2 is a side view of the same blank.
Figure 3:
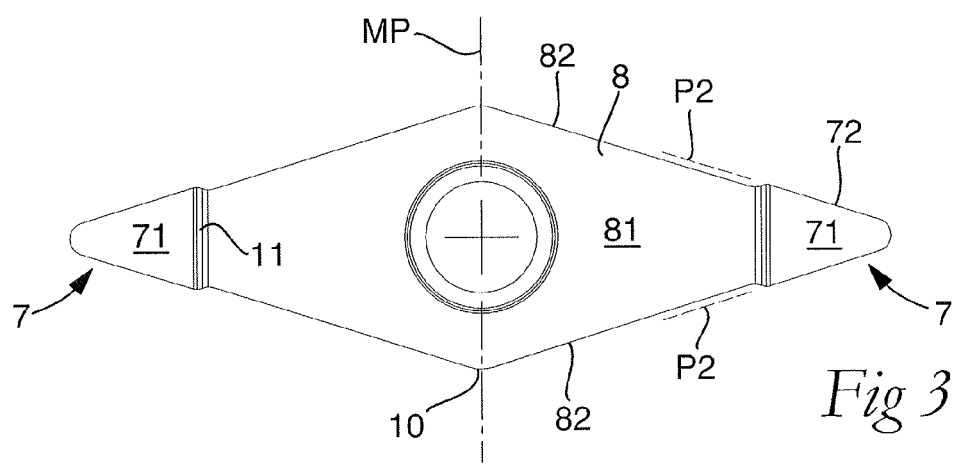
FIG. 3 is a planar view from above of the blank.

In FIGS. 1-3, a blank of cemented carbide formed in accordance with the embodiment is shown, which in the area of the prospective cutting edges has been formed with wedge-shaped heads 7, which at the rear ends thereof transform into likewise generally wedge-shaped parts 8 of the intermediate body 9 in which the hole 6 of the cutting insert is formed. Each individual head 7 is delimited by, among other things, one (prospective) chip surface 71 and two (prospective) clearance surfaces 72, which at the tip or nose of the head transform into each other via a generally rounded transition surface 73. The under side of the head 7 is included in the under side of the cutting insert 2 in its entirety. The tapering body parts 8 are in turn partially delimited by a common upper side 81 as well as by two pairs of opposite side surfaces 82 that meet each other in radius transitions 10 situated in the center plane MP of the cutting insert. The transitions between the heads 7 and the body parts 8 are a series of narrow, alternately convex and concave part surfaces, which together are designated 11. The two surfaces 71 on the heads 7 and the intermediate surface 81 are part surfaces included in the upper side of the prospective cutting insert that generally is designated 1.

As is clearly seen in FIG. 2, the chip surfaces 71 of the heads 7 and the intermediate surface 81 on the body 9 of the cutting insert are situated on different levels. More precisely, the surface 81 is situated under or inside an imaginary plane P1 in the extension of the individual chip surface 71. In an analogous way, the two side surfaces 82 of the individual body part 8 (see FIG. 3) are situated inside schematically outlined planes P2 in the extension of the two clearance surfaces 72 of the head.

Figure 4:
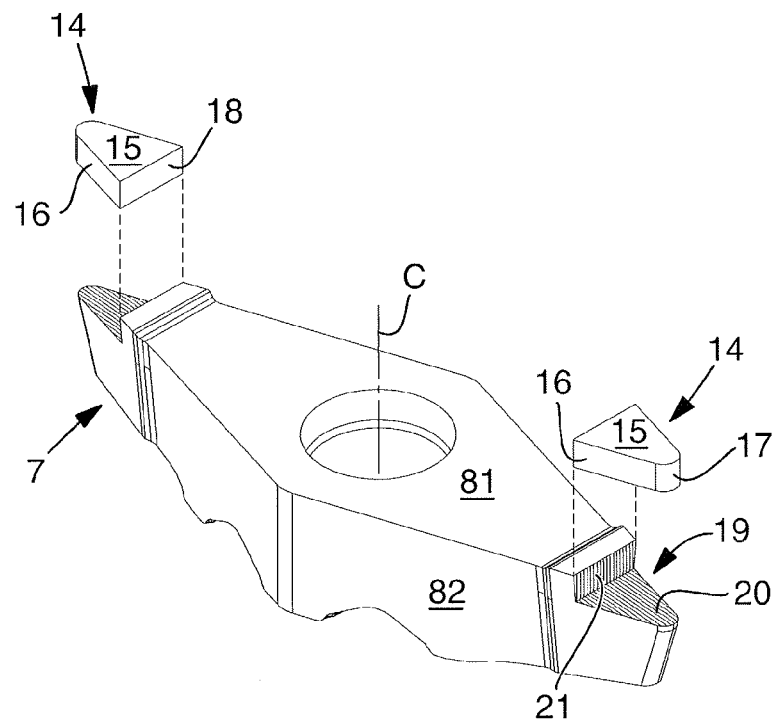
FIG. 4 is a perspective exploded view showing how two pockets for each inset have been formed in the blank.
Figure 5:
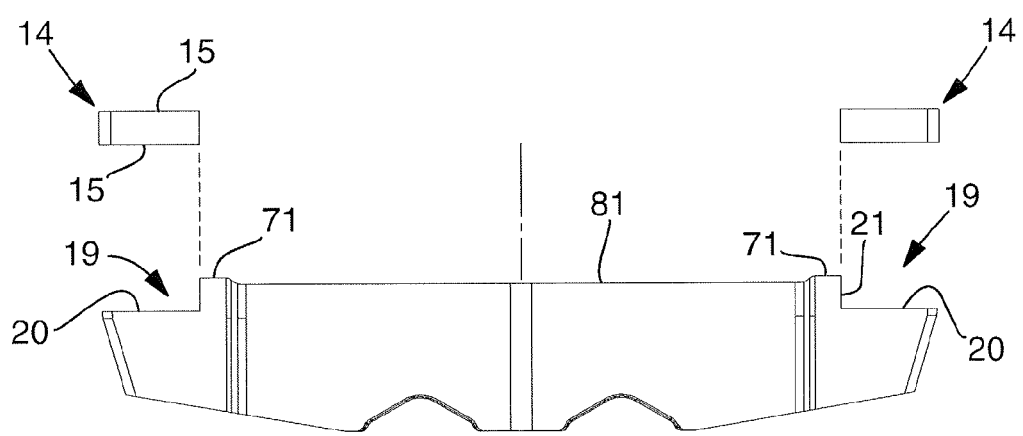
FIG. 5 is a side view of the blank and the insets in the same state.

Beside the cemented carbide blank shown in FIGS. 1-3, also hard insets are made, which are designated 14 in FIGS. 4 and 5. Like the heads 7, each such inset 14 is wedge-shaped or triangular. More precisely, the inset is delimited between two opposite plane surfaces 15, two opposite side surfaces 16, which converge toward a common transition surface 17, as well as a rear, plane end wall 18, which advantageously extends perpendicular to the upper and under sides 15. As has been previously mentioned, the material of the inset 14 may be cubic boron nitride or polycrystalline diamond, i.e., a material that is harder than cemented carbide.

In order to house the individual inset 14, in each head 7, there is formed a pocket 19 that is delimited by a plane bottom surface 20 and a rear end wall 21, which forms essentially the same angle (e.g. 90°) with the bottom surface 20 as the end surface 18 of the inset 14 forms with the surfaces 15. The pocket may advantageously be provided by grinding, although also milling is possible.

Figure 6:
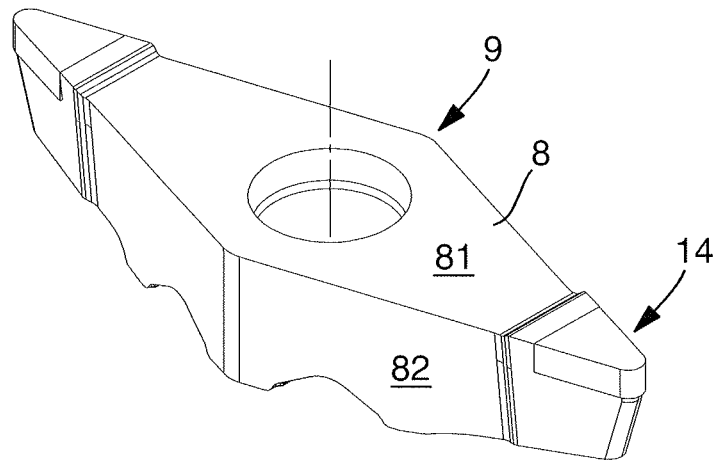
FIG. 6 is a top perspective view showing the two insets fixed in the pockets of the blank.

The next step of the manufacture is shown in FIGS. 6 and 7. Here, the individual inset 14 has been fixed in the appurtenant pocket. The fixation may advantageously be made by soldering. It should be observed that the original shape and dimensions of the inset in this step do not need to exactly agree with the corresponding shape and dimensions of the pocket. Accordingly, moderate over- or undermeasures are fully acceptable provided that complementary contact surfaces 15/20 and 18/21, respectively, can be soldered to each other.

The final step of the manufacture is illustrated in FIGS. 8 and 9. Here, the individual inset 14 has been ground into the surrounding cemented carbide included in the head 7. The grinding is essentially made by face grinding of the chip surface 71 and one or more sweeping grinding operations in order to create clearance surfaces adjacent to the cutting edge 3. These clearance surfaces may be plane surfaces 72 adjacent to the main edges 4 and a convex clearance surface 73 adjacent to the nose edge 5. In FIGS. 8 and 9, it is clearly seen how the grinding is not driven further than to the transition of the head 7 to the appurtenant body part 8, more precisely as a consequence of the head generally corbelling out in relation to the adjacent body part 8 in the way that has been described above, i.e., by the surfaces 81, 82 being situated inside imaginary planes P1, P2 in the extension of the surfaces 71 and 72, respectively, (cf. FIGS. 2 and 3). In practice, the level difference between the respective surfaces may be moderate, e.g. some tenth of a millimeter, but in spite of this ensure that a grinding disc can be brought along the head without contacting the body part 8.

In the preferred embodiment, the tip angle or angle of convergence of the individual head 7 is as great as the angle of convergence of the body part 8.

In order to additionally clarify the structure of the cutting insert, reference is now made to FIGS. 10-15, which illustrate a concrete example in which the ground pocket 19 has a length L1 amounting to 2.9 mm and a depth D of approx. 1 mm, the rear end wall 21 of the pocket having a width B1 of 2.6 mm. The unmachined inset 14 has simultaneously a length L2 of 3.0 mm and a thickness T of approx. 1 mm, besides which the width B2 of the inset along the rear end wall 18 amounts to 2.6 mm. The angle γ at the nose of the inset 14 may be 90°. The radius R1 along the convex transition 73 amounts to 0.4 mm, while the corresponding transition 17 of the inset has a radius R2 of 0.5 mm. In other words, the inset has a length-wise overmeasure of approx. 0.1 mm in relation to the pocket.

Figure 14:
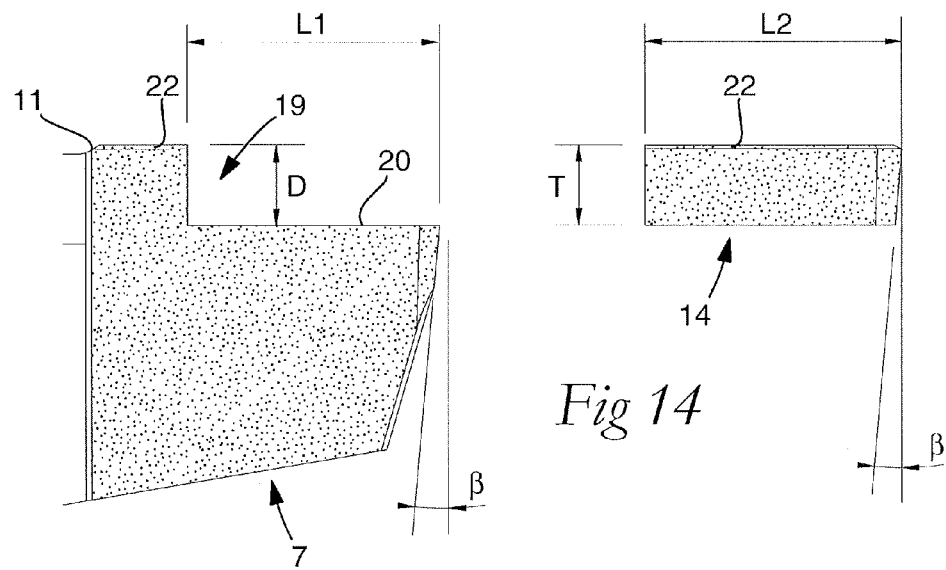
FIG. 14 shows the inset in finish-ground state, although exploded away from the pocket to make clear the finish-ground dimensions.
Figure 15:
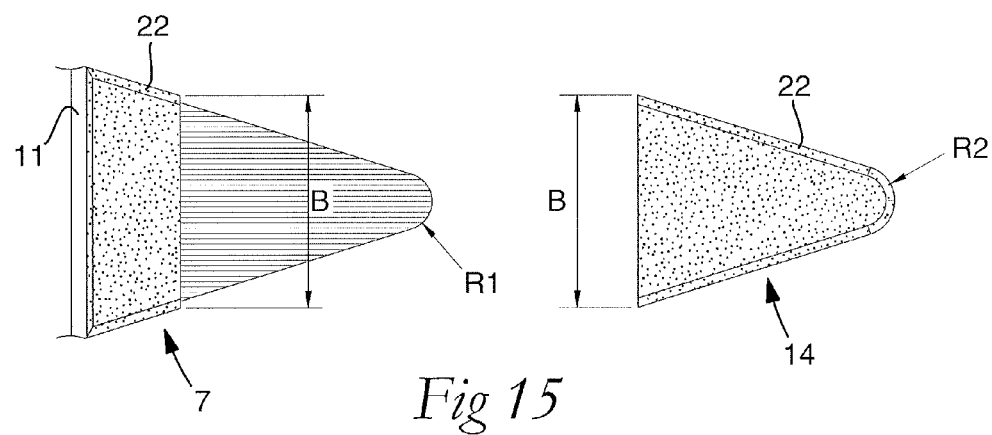
FIG. 15 is an exploded planar view from above of the inset in the same state as in FIG. 14.

In FIGS. 14 and 15, the cutting insert is shown in its finish-ground state, although the fixed and ground cutting insert is shown exploded away from the appurtenant pocket. In this state, the inset 14 as well as the surrounding cemented carbide of the head 7 have been ground down by 0.1 mm. In such a way, the depth D of the pocket 19 and the thickness T of the inset 14 have been reduced to 0.9 mm at the same time as the length L1 of the pocket along the bottom surface 20 has been reduced to 2.8 mm, while the length L2 of the inset 14 along the upper side has been reduced to 2.9 mm. The difference (0.1 mm) between L1 and L2 is explained by a clearance having been ground into the front transition surface 17 of the inset, more precisely at a clearance angle β that amounts to 5°. Furthermore, the width B of the inset as well as of the pocket has been reduced from 2.6 mm to 2.4 mm. Adjacent to the upper side 1a of the completed head, a reinforcement bevel 22 has also been formed, which extends along the inset 14 as well as the adjacent part of the head 7 up to the transition 13b.

For the sake of clarity, it should be pointed out that the described cutting insert is intended for a maximum cutting depth that does not exceed the length L2 of the inset 14. In other words, the chip removal should solely take place along the individual main edge 4 that is formed in the hard inset, but not along the adjacent edge that is obtained by the grinding of the surrounding cemented carbide of the chip and clearance surfaces 71, 72 of the head.

Figure 19:
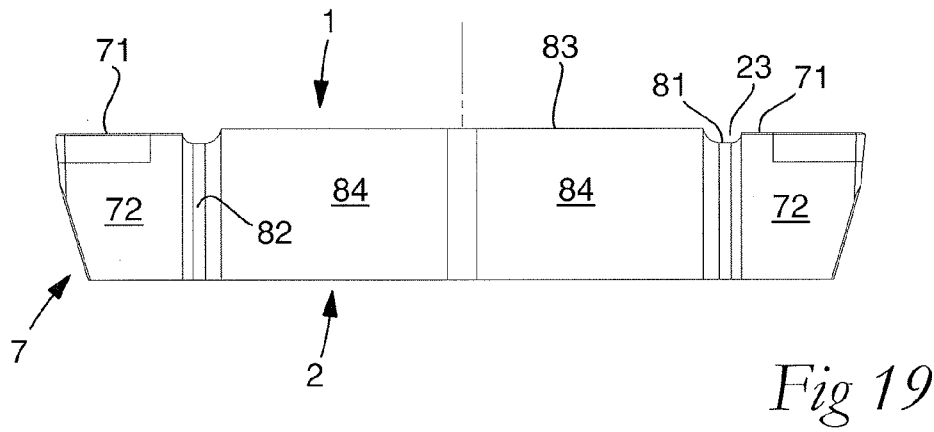
FIG. 19 is a side view of an alternative embodiment of the cutting insert according to the invention.
Figure 20:
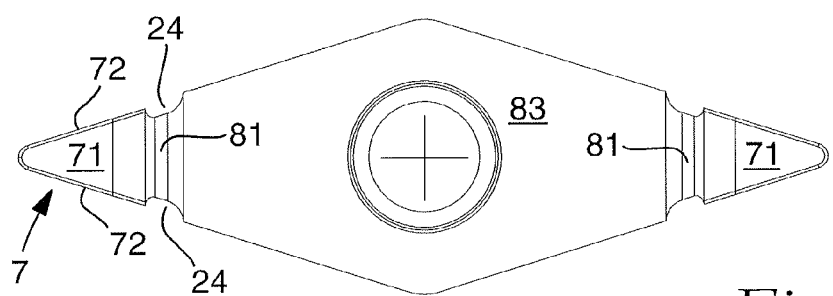
FIG. 20 is a planar view from above of the cutting insert in FIG. 19.

Reference is now made to FIGS. 19-20, which illustrate an alternative embodiment of a cutting insert, the under side 2 of which is plane and intended to be pressed against a likewise plane bottom surface in a co-operating seat in the basic body of the tool. In this case, the cutting insert is fixed by the fact that rear side surfaces on the same are pressed (e.g. by a screw) against complementary side support surfaces in the seat. Another difference in relation to the previously described embodiment is that a great part of the upper side 1 of the cutting insert is a central part surface 83, which is situated on a higher level than the chip surfaces 71 on the heads 7, the countersunk or narrowed limiting surface 81 adjacent to the individual head 7 forming a bottom in a chute 23 that separates the head 7 from the central part surface 83. Furthermore, the narrowed limiting surfaces 82 along the sides of the cutting insert are bottoms in chutes 24 that separate the clearance surfaces 72 from side surfaces 84, which in this case are situated flush with the clearance surfaces 72 of the head. Even if the thus created chutes 23, 24 are comparatively narrow, the same are fully sufficient to allow a grinding disc to clear from the limiting surfaces 83, 84. Here, it should be pointed out that these surfaces 83, 84 situated behind the limiting surfaces 81, 82 may be formed in most varying ways. For instance, it is possible to tilt the side surfaces 84 in the downward/outward direction, more precisely with the purpose of enlarging the width of the under side and thereby improve the stability of the cutting insert in the mounted state.

A fundamental advantage of the cutting insert according to the embodiment is that the same can be provided with an extraordinary hard nose inset, the cutting edge of which for certain can be located in an exact, desired position in the cutting insert in respect of the distance of the nose edge from the support points of the cutting insert as well as of the vertical position thereof in relation to the under side of the cutting insert. Another advantage is that the need of grinding is reduced to an absolute minimum, since the requisite grinding is limited to the comparatively short head in which the individual inset is countersunk.

The invention is not limited only to the embodiment described above and shown in the drawings. Thus, the invention may also be applied to other cutting inserts than turning inserts, e.g. milling inserts. Furthermore, the tip angle or angle of convergence of the wedge-shaped head may vary most considerably, e.g. within the range of 30-90°. Also, the shape of the nose edge may deviate from the round or circular shape that has been exemplified in the drawings. The concept "grinding" should be interpreted in wide sense so far that comparable machining methods that provide the same final result as grinding also can be employed without deviating from the general idea of the invention. An example of such a method is sparking. It is also possible to combine grinding and sparking, for instance by sparking the chip surface while providing chip breakers of most varying topography, at the same time as plane clearance surfaces are provided by grinding. Furthermore, it should be pointed out that indexable cutting inserts, of the type that includes two or more cutting edges, may be manufactured with only one superhard inset such as CBN, diamond or ceramics, while other cutting edges are formed of cemented carbide. It should also be pointed out that the blank according to the embodiment (as shipped) may have either the shape shown in FIGS. 1-3, i.e., without any pocket for an inset, or the shape shown in FIGS. 4 and 5, i.e., with a pre-formed pocket in which an inset can be directly fixed without any chip removing machining.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A cemented carbide insert, comprising:
    an upper side;
    an under side;
    a plurality of side surfaces extending between the upper side and the under side; and
    an inset including a cutting edge, the cutting edge comprising a nose edge and two main edges converging toward the nose edge, the inset being formed of a material that is harder than the cemented carbide, and being countersunk in the surrounding cemented carbide and co-ground with the surrounding cemented carbide,
    wherein the inset is arranged in a front, wedge-shaped head delimited by one chip surface and two clearance surfaces running along the main edges, the head transforming into adjacent side surfaces and an adjacent intermediate surface via limiting surfaces situated inside imaginary planes in an extension of the chip surface and an extension of the clearance surfaces, and
    wherein the limiting surfaces are non-parallel to a mounting axis of the insert.

2. The cemented carbide insert according to claim 1, wherein the insert is indexable by including a plurality of cutting edges, which are equidistantly separated from the under side as well as from a geometrical locus that determines the lateral position of the nose edge in relation to a locating support point.

3. The cemented carbide insert according to claim 1, wherein the limiting surfaces behind the head are included as bottoms in chutes, which separate the head from the rest of the body part.

4. The cemented carbide insert according to claim 1, wherein the angle of convergence between the two clearance surfaces of the head and the angle of convergence between the two adjacent limiting surfaces are equal.

5. A cemented carbide blank for the manufacture of the cemented carbide insert according to claim 1.

6. The cemented carbide blank according to claim 5, wherein adjacent to a front portion of the head, a pocket is formed, which is delimited by a plane bottom surface and a rear end wall.

7. The cemented carbide insert according to claim 1, wherein the limiting surfaces are a series of alternately convex and concave part surfaces.

8. The cemented carbide insert according to claim 7, wherein the series of alternately convex and concave part surfaces transition both the chip surface into an intermediate surface and the clearance surface into a side surface.

9. The cemented carbide insert according to claim 1, wherein the chip surface of the wedge and an intermediate surface of the adjacent body define different planes.

10. The cemented carbide insert according to claim 9, wherein the different planes defined by the chip surface and the intermediate surface are parallel.

11. The cemented carbide insert according to claim 9, wherein the clearance surface of the wedge and a side surface of the adjacent body define different planes.

12. The cemented carbide insert according to claim 11, wherein the different planes defined by the chip surface and the intermediate surface are parallel and the different planes defined by the clearance surface and the side surface are parallel.

13. The cemented carbide insert according to claim 1, wherein the clearance surface of the wedge and a side surface of the adjacent body are in different planes.

14. A cemented carbide insert, comprising:
- an intermediate body including an upper side, an under side, pairs of opposite side surfaces extending between the upper side and the underside, and a through hole extending from the upper side to the under side;
- a wedge-shaped head at two opposite acute ends of the insert, the wedge-shaped head delimited by one chip surface and two clearance surfaces running along the main edges;
- one or more transition surfaces connecting the wedge-shaped head to the intermediate body; and
- an inset countersunk in the cemented carbide of the wedge-shaped head and co-ground with the cemented carbide wherein the inset is formed of a material that is harder than the cemented carbide,
- wherein the inset includes a cutting edge, the cutting edge comprising a nose edge and two main edges converging toward the nose edge,
- wherein the chip surface of the wedge-shaped head and the upper surface of the adjacent body define different planes,
- wherein each of the two clearance surfaces of the wedge-shaped head and an adjacent one side surface of the pair of opposite side surfaces of the intermediate body define different planes, and
- wherein the transition surfaces joining the chip surface of the wedge-shaped head to the upper surface of the adjacent body are non-parallel to a mounting axis of the insert.

15. The cemented carbide insert according to claim 14, wherein the different planes defined by the chip surface and the intermediate surface are parallel and the different planes defined by the clearance surfaces and the side surfaces are parallel.

16. The cemented carbide insert according to claim 14, wherein the transition surfaces are situated inside imaginary planes in an extension of the chip surface and the clearance surfaces.

17. The cemented carbide insert according to claim 14, wherein the transition surfaces are a series of alternately convex and concave part surfaces.

* * * * *